United States Patent
Kaphengst et al.

(10) Patent No.: US 12,128,975 B2
(45) Date of Patent: Oct. 29, 2024

(54) PARTIALLY ASSEMBLED VEHICLE THAT AUTONOMOUSLY COMPLETES ITS OWN ASSEMBLY, AND METHODS FOR PRODUCING SAME

(71) Applicant: GM GLOBAL TECHNOLOGY OPERATIONS LLC, Detroit, MI (US)

(72) Inventors: Michael R Kaphengst, Leonard, MI (US); Seog-Chan Oh, Troy, MI (US); Alfred J. Manser, White Lake, MI (US); James W Wells, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 17/453,986

(22) Filed: Nov. 8, 2021

(65) Prior Publication Data
US 2023/0145508 A1    May 11, 2023

(51) Int. Cl.
*B62D 65/02* (2006.01)
*B60W 10/04* (2006.01)
(Continued)

(52) U.S. Cl.
CPC .......... *B62D 65/022* (2013.01); *B60W 10/04* (2013.01); *B60W 10/20* (2013.01);
(Continued)

(58) Field of Classification Search
CPC . B62D 65/022; B60W 60/0025; B60W 10/04; B60W 10/20; G05B 19/4155;
(Continued)

(56) References Cited

U.S. PATENT DOCUMENTS 6,240,328 B1 * 5/2001 LaLonde ................ G06Q 10/06
                                                            700/95
6,516,239 B1 * 2/2003 Madden ............. G05B 19/4183
                                                            700/228
(Continued)

FOREIGN PATENT DOCUMENTS

DE    102019114796 A1    5/2020

*Primary Examiner* — Jess Whittington
*Assistant Examiner* — Terry C Buse
(74) *Attorney, Agent, or Firm* — Lorenz & Kopf LLP

(57) ABSTRACT

A partially assembled vehicle that autonomously completes its own assembly, including a chassis, wheels that are rotationally coupled to the chassis, a drive system mounted on the chassis and in operational communication with the wheels, a navigation system, a central platform controller, and a position determining system. Added thereto is a safety sensor guidance system and a controller circuit programmed to begin a temporary takeover of the central platform controller, responsive to an external fleet control. The temporary takeover including the steps of identifying a plurality of assembly stations that the partially assembled vehicle must visit to complete its own assembly; constructing a sequence in which to visit each of the plurality of assembly stations; and commanding the drive system to propel and steer the partially assembled vehicle through the sequence of the plurality of assembly stations, responsive to sensor input from the safety sensor guidance system.

20 Claims, 4 Drawing Sheets

(51) Int. Cl.
*B60W 10/20* (2006.01)
*B60W 60/00* (2020.01)
*G05B 19/4155* (2006.01)
*G07C 5/00* (2006.01)

(52) U.S. Cl.
CPC ..... *B60W 60/0025* (2020.02); *G05B 19/4155* (2013.01); *G07C 5/008* (2013.01); *G05B 2219/31368* (2013.01); *G05B 2219/50393* (2013.01)

(58) Field of Classification Search
CPC ........... G05B 2219/31368; G05B 2219/50393; G07C 5/008
See application file for complete search history.

(56) References Cited

U.S. PATENT DOCUMENTS

| | | | |
|---|---|---|---|
| 6,662,167 B1* | 12/2003 | Xiao | G06N 3/126 |
| | | | 706/912 |
| 2018/0091930 A1* | 3/2018 | Jefferies | G07C 9/00571 |
| 2019/0227520 A1* | 7/2019 | Chen | G05B 19/406 |
| 2020/0140028 A1* | 5/2020 | Wells | G05D 1/0225 |
| 2020/0156722 A1* | 5/2020 | Watkins | B62D 15/025 |
| 2021/0308860 A1* | 10/2021 | Skaaksrud | B25J 9/162 |
| 2022/0009087 A1* | 1/2022 | Skaaksrud | G16H 40/20 |
| 2022/0078084 A1* | 3/2022 | Fang | H04L 61/3025 |
| 2022/0163965 A1* | 5/2022 | Nielsen | G05D 1/225 |
| 2023/0058660 A1* | 2/2023 | Kanthimathinathan | ............... |
| | | | G01S 19/14 |

* cited by examiner

PARTIALLY ASSEMBLED VEHICLE THAT AUTONOMOUSLY COMPLETES ITS OWN ASSEMBLY, AND METHODS FOR PRODUCING SAME

TECHNICAL FIELD

The present disclosure generally relates to the manufacture of vehicles, and specifically relates to a partially assembled vehicle that autonomously completes its own assembly.

Available vehicle manufacturing methodologies generally rely on a fixed assembly line with a conveyer. The fixed assembly line conveyer enforces a fixed sequence of assembly steps; this prevents optimizing assembly station use. Further, when the fixed assembly line conveyer breaks down, it affects all vehicles attached thereto.

The following disclosure provides a technological solution to these technical problems, in addition to addressing related issues. Furthermore, other desirable features and characteristics of the system and method will become apparent from the subsequent detailed description and the appended claims, taken in conjunction with the accompanying drawings and the preceding background.

SUMMARY

A provided embodiment is a partially assembled vehicle that autonomously transports itself through its own assembly process, the partially assembled vehicle including: a chassis and wheels that are rotationally coupled to the chassis, a drive system mounted on the chassis and in operational communication with the wheels, and further including, on-board the chassis, and in operable communication with each other: a navigation system, a central platform controller, and a position determining system; a safety sensor guidance system is vehicle mounted to the chassis, the safety sensor guidance system including a sensor, a transceiver, and an emergency stop (estop) device; and a controller circuit operationally coupled to the central platform controller and the safety sensor guidance system, the controller circuit programmed to: begin a temporary takeover of the central platform controller, responsive to receiving a begin data package, the temporary takeover including the steps of: activating the transceiver to continuously communicate with the external fleet control source; identifying a plurality of assembly stations that the partially assembled vehicle must visit to complete its own assembly; constructing a sequence in which to visit each of the plurality of assembly stations; commanding the drive system to propel, brake and steer the partially assembled vehicle through the sequence of the plurality of assembly stations, responsive to sensor data from the safety sensor guidance system; determining, when the partially assembled vehicle is at each assembly station in the sequence, that an assembly associated with the assembly station was completed upon passing a respective in-station diagnostic test; wherein, commanding the drive system is further a function of determining, for a current assembly station, that the assembly associated with the current assembly station was completed; modifying or interrupting the commanding of the drive system of the partially assembled vehicle through the sequence, responsive to receiving a repair data package from the external fleet control source; preventing operation of the drive system responsive to detecting an activation of the estop device; determining that the partially assembled vehicle has autonomously completed its own assembly upon determining that the partially assembled vehicle has completed the sequence; and ending the temporary takeover upon determining that the partially assembled vehicle has autonomously completed its own assembly; and alert the external fleet control source upon determining that the partially assembled vehicle has autonomously completed its own assembly.

In an embodiment, the controller circuit is further programmed to perform the steps of: determining, when the partially assembled vehicle is at an assembly station of the plurality of assembly stations that the partially assembled vehicle visits to complete its own assembly, that the assembly associated with the assembly station is incomplete upon failing the respective in-station diagnostic test; alerting the external fleet control source to an incomplete assembly; and wherein commanding the drive system is further a function of routing instructions responsive to the incomplete assembly.

In an embodiment, the begin data package identifies a model and configuration information for the partially assembled vehicle, and wherein the controller circuit is further programmed to generate the sequence as a function of the model and configuration information.

In an embodiment, beginning the temporary takeover of the central platform controller includes installing a temporary program into the central platform controller, and wherein the controller circuit is further programmed to remove the temporary program subsequent to alerting the external fleet control source that the partially assembled vehicle has autonomously completed its own assembly.

In an embodiment, the temporary program includes instructions that override power distribution in the partially assembled vehicle, and instructions that control functionality of propulsion, braking and steering.

In an embodiment, the sequence is one of multiple potential sequences in which to visit each of the plurality of assembly stations, and wherein the controller circuit is further programmed to: receive, from each of the plurality of assembly stations, a status indicator; and construct the sequence as a function of the received status indicators.

In an embodiment, the safety sensor guidance system further includes a path projector configured to project a visible beam forward from a center of the partially assembled vehicle.

In an embodiment, the sensor in the safety sensor guidance system is a first sensor affixed to a first corner of the chassis, and wherein the safety sensor guidance system further includes a second sensor affixed to a second corner of the chassis.

In an embodiment, the first sensor and the second sensor are each configured to detect intrusion into a predetermined range from the respective sensor.

In an embodiment, the predetermined range is less than two feet but in practice would be dictated by accepted standards for safety rated sensing and stopping distance.

An embodiment provides a method for a partially assembled vehicle to autonomously transporting itself through the process to complete its own assembly, the method including: constructing the partially assembled vehicle including a chassis and wheels that are rotationally coupled to the chassis, a drive system mounted on the chassis and in operational communication with the wheels, and, on-board the partially assembled vehicle, and in operable communication with each other: a navigation system, a central platform controller, and a position determining system; mounting a safety sensor guidance system to the chassis, the safety sensor guidance system including a sensor, a transceiver, and an emergency stop (estop) device; and at controller circuit operationally coupled to the central platform controller and the safety sensor guidance system, performing the steps of: receiving a begin data package from an external fleet control source; beginning a temporary takeover of the central platform controller, responsive to receiving the begin data package, the temporary takeover including the steps of: activating the transceiver to continuously communicate with the external fleet control source; identifying a plurality of assembly stations that the partially assembled vehicle must visit to complete its own assembly; constructing a sequence in which to visit each of the plurality of assembly stations; commanding the drive system to propel and steer the partially assembled vehicle through the sequence of the plurality of assembly stations, responsive to sensor data from the safety sensor guidance system; determining, when the partially assembled vehicle is at each assembly station in the sequence, that an assembly associated with the assembly station was completed upon passing a respective in-station diagnostic test; wherein, commanding the drive system is further a function of determining, for a current assembly station, that the assembly associated with the current assembly station was completed; modifying or interrupting the commanding of the drive system of the partially assembled vehicle through the sequence, responsive to receiving a repair data package from the external fleet control source; preventing operation of the drive system responsive to detecting an activation of the estop device; and ending the temporary takeover upon determining that the partially assembled vehicle has autonomously completed its own assembly; and alert the external fleet control source upon determining that the partially assembled vehicle has autonomously completed its own assembly.

In an embodiment, determining, when the partially assembled vehicle is at each assembly station in the sequence, that the assembly associated with the assembly station is incomplete upon failing the respective in-station diagnostic test; alerting the external fleet control source to an incomplete status; and wherein commanding the drive system is further a function of routing instructions responsive to the incomplete status.

In an embodiment, the begin data package identifies a model and configuration information for the partially assembled vehicle, and further including generating the sequence as a function of the model and configuration information.

In an embodiment, beginning the temporary takeover of the central platform controller includes installing a temporary program into the central platform controller, and further including removing the temporary program subsequent to alerting the external fleet control source that the partially assembled vehicle has autonomously completed its own assembly.

In an embodiment, the temporary program includes instructions that override power distribution in the partially assembled vehicle, and instructions that control functionality of propulsion and steering.

In an embodiment, the sequence is one of multiple potential sequences in which to visit each of the plurality of assembly stations, and further including: receiving, from each of the plurality of assembly stations, a status indicator; and constructing the sequence as a function of the received status indicators.

In an embodiment, the sensor in the safety sensor guidance system is a first sensor affixed to a first corner of the chassis, and wherein the safety sensor guidance system further includes a second sensor affixed to a second corner of the chassis.

An embodiment of a safety sensor guidance system for temporary use on a partially assembled vehicle that autonomously transports itself through the process and completes its own assembly, is provided. The safety sensor guidance system includes: an auxiliary navigation sensor; a sensor configured to detect intrusion into a predetermined range; an estop device; and a communication fabric in operational communication with the auxiliary navigation sensor, the sensor, and the estop device, the communication fabric configured to receive a begin data package from an external source and, responsive thereto, begin a temporary takeover of a central platform controller, including the steps of: commanding the drive system to propel and steer the partially assembled vehicle through a sequence of a plurality of assembly stations; receiving, from the central platform controller, a determination, when the partially assembled vehicle is at each assembly station in the sequence, that an assembly associated with the assembly station was completed upon passing a respective in-station diagnostic test; further commanding the drive system as a function of the determination, for a current assembly station, that the assembly associated with the current assembly station was completed; modifying or interrupting the commanding of the drive system of the partially assembled vehicle through the sequence, responsive to receiving a repair data package from the external source; preventing operation of the drive system responsive to detecting an activation of the estop device; determining that the partially assembled vehicle has autonomously completed its own assembly upon determining that the partially assembled vehicle has completed the sequence; and ending the temporary takeover upon determining that the partially assembled vehicle has autonomously completed its own assembly.

In an embodiment, further including, one or more visual alerting devices in operable communication with the communication fabric and configured to visually represent a respective status of a system of the partially assembled vehicle.

In an embodiment, further including a support structure that is configured to envelope at least a portion of the partially assembled vehicle and to be attached thereto, to which remaining components of the safety sensor guidance system are attached.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" may refer to any hardware, software, firmware, electronic control component, processing logic, and/or processor device, individually or in any combination, that provides the functionality attributed to the module. In various embodiments, a module includes one or more of: an application specific integrated circuit (ASIC), a field-programmable gate-array (FPGA), an electronic circuit, a computer system comprising a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, available vehicle manufacturing methodologies generally rely on a fixed assembly line with a conveyor. The fixed assembly line conveyer enforces a fixed sequence of assembly steps; this prevents optimizing assembly station use. Further, when the fixed assembly line conveyer breaks down, it affects all vehicles attached thereto.

Figure 1:
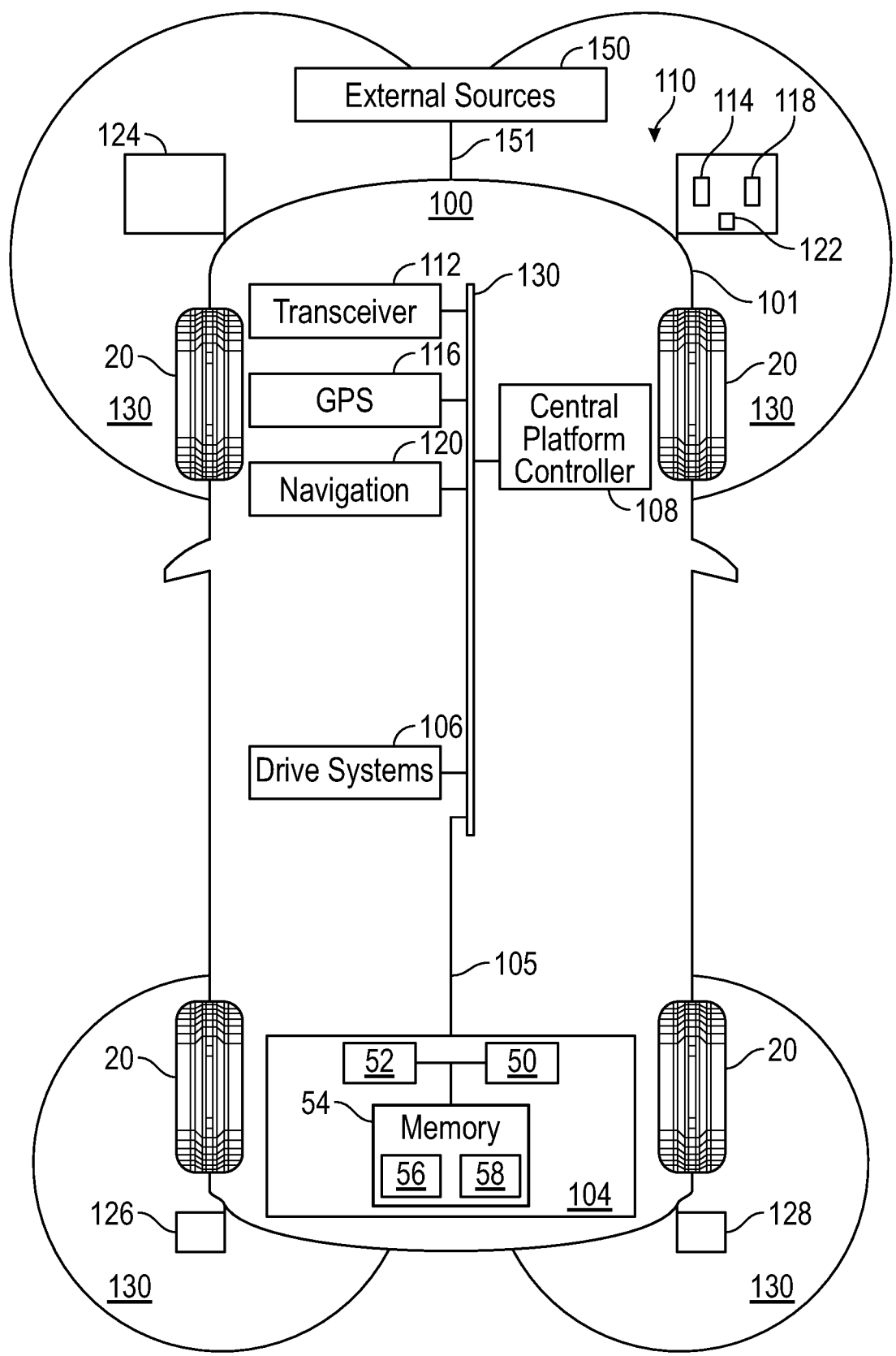
FIG. 1 is a schematic diagram illustrating a partially assembled vehicle that autonomously completes its own assembly, in accordance with various embodiments.

Exemplary embodiments provide a technological solution to this problem, in the form of a partially assembled vehicle 100 that autonomously transports itself though its own assembly process (hereinafter shortened to partially assembled vehicle 100), as shown in FIG. 1. As used herein, autonomously means without further human input or guidance. As will be described in more detail below, the provided partially assembled vehicle 100 is autonomous (self-guided and self-powered), which permits the vehicle tires (wheels 20) to be placed onto the assembly plant floor, rather than on a conveyer system. The provided partially assembled vehicle 100 continually communicates with fleet management, wired or wirelessly, and can temporarily repurpose (during the temporary takeover) various onboard ECM modules with manufacturing specific software protocols to accept commands for odometry, deceleration, acceleration, operator sensing, and safety protocols. The provided partially assembled vehicle 100 utilizes the existing on-board power management infrastructure to route power to the drive systems 106 and to control safety during assembly. The provided partially assembled vehicle 100 can perform in-station testing and diagnostics, utilize the fleet management system for in station correction or to request that the vehicle be rerouted to a repair area.

Embodiments of the partially assembled vehicle 100 comprise a chassis 101, and wheels 20, each of which are rotationally coupled to the chassis 101 near a respective corner of the chassis. The partially assembled vehicle 100 is depicted with four wheels 20, but the number of wheels 20 may vary in other embodiments. The partially assembled vehicle 100 includes at least a collective functional block, drive systems 106, which generally includes known vehicle systems for vehicle operation, such as, a propulsion system, a transmission system, a steering system, actuators for the wheels, and a brake system, and generates a variety of signals, including vehicle speed and vehicle acceleration. In various embodiments, the drive systems 106 are operationally coupled to one or more onboard components and systems via a communication bus 130. The partially assembled vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, logistics transporters, drones, and other vehicles may also be used. When its assembly is completed, the partially assembled vehicle 100 may be an autonomous or a semi-autonomous vehicle.

Various embodiments of the partially assembled vehicle 100 may include one or more other components and/or onboard systems that communicate with each other, generally via the communication bus 130. Non-limiting examples of the onboard components communicating via the communication bus 130 include the drive systems 106, a central platform controller 108, a transceiver 112, a global and/or local position determining system 116, and a navigation system using cameras, scanners or other forms of sensing the environment surrounding the vehicle. 120. Various embodiments of the partially assembled vehicle 100 further include a controller circuit 104 and a safety sensor guidance system 110. The functions and operations of each of these components are described in more detail below.

The controller circuit 104 manages communication between the partially assembled vehicle 100 and external sources 150. External sources 150 includes one or more external fleet controllers and assembly station controllers that are external to the partially assembled vehicle 100, in the environment surrounding the partially assembled vehicle 100.

The transceiver 112 may be configured to enable communication between onboard components and systems and various external sources 150, such as cloud server systems. Accordingly, in various embodiments, the transceiver 112 includes the hardware and software to support one or more communication protocols for wireless communication 151 (e.g., Wi-Fi and Bluetooth) between the Controller Circuit 104 and external sources, such as routers, internet, the cloud, satellites, communication towers and ground stations. The transceiver 112 may also be adapted for wired communication, supporting one or more input ports. In various embodiments, the transceiver 112 may be integrated within the central platform controller, integrated within another onboard control module, and dis-integrated, having at least a functioning portion located with a safety sensor guidance system 110.

Position determining system 116 may be a global positioning system as is known in the mobile platform industry and/or local position determining system, designed to operate inside a facility. Position determining system 116 may interact via the transceiver 112 and various external sources to provide information about a location in three-dimensional space of the vehicle at any given time.

Navigation system 120 may obtain and process signals from various onboard components to make determinations about current location, trajectory, speed, acceleration, etc., as well as coordinate with the central platform controller 108 and position determining system 116 to plan a future location, trajectory, speed, acceleration, turns, and the like.

In various embodiments, the central platform controller 108 is configured to receive and integrate communications from the modules and systems onboard the partially assembled vehicle 100. Accordingly, the central platform controller 108 may manage operations of the drive systems 106, the global positioning system (position determining system 116), and the navigation system 120, as well as managing communications from off-board sources (e.g., from external sources 150, via the transceiver 112).

In various embodiments, the central platform controller 108 is configured to manage and distribute power onboard the partially assembled vehicle 100, this may be via a separate power management module and battery, or with a power management module and battery integrated within the central platform controller.

As is described in more detail below, the partially assembled vehicle 100 autonomously completes its own assembly, which is understood to imply that a variety of additional modules and systems will be integrated or installed onboard the partially assembled vehicle 100. Accordingly, the central platform controller 108 is configured to adapt to each new assembly component and integrate a variety of additional vehicle components, as added at one or more assembly stations (see, FIG. 2). Non-limiting examples of vehicle components and activities that may be added at various assembly stations include, adding metal to form the body, painting the vehicle, installing HVAC, finalizing drive system components, installing trim, installing a user interface configured to provide any combination of touch, voice/audio, cursor, button press and gesture control; an added mapping system that includes a database for storing up to date and high-resolution maps of streets, environmental features; an added camera system, and the like.

Embodiments of the partially assembled vehicle 100 may include a safety sensor guidance system 110 and a controller circuit 104. The safety sensor guidance system 110 can be mounted to the chassis 101. In an embodiment, the safety sensor guidance system 110 comprises a sensor 114, a transceiver 112, and an emergency stop (estop) device 118. In various embodiments, the sensor 114 is configured to detect intrusion into a predetermined range 130, measured outward from the respective sensor. In various embodiments, the predetermined range is less than two feet but in practice would be dictated by accepted standards for safety rated sensing and stopping distance. In some embodiments, the safety sensor guidance system 110 further includes a path projector 122 configured to project a visible beam forward from the partially assembled vehicle 100. In some embodiments of the safety sensor guidance system 110, multiple sensors 114 are affixed at one or more different corners of the chassis. For example, the sensor 114 in the safety sensor guidance system 110 may be a first sensor affixed to a first corner of the chassis, and wherein the safety sensor guidance system 110 further includes a second sensor affixed (124) to a second corner of the chassis, a third sensor affixed (126) to a third corner of the chassis, and a fourth sensor affixed (128) to a fourth corner of the chassis. Each sensor 114 may be configured to sense in a three-dimensional volume 132, such that the volumes 132 overlap to create a buffer zone around the chassis.

Figure 4:
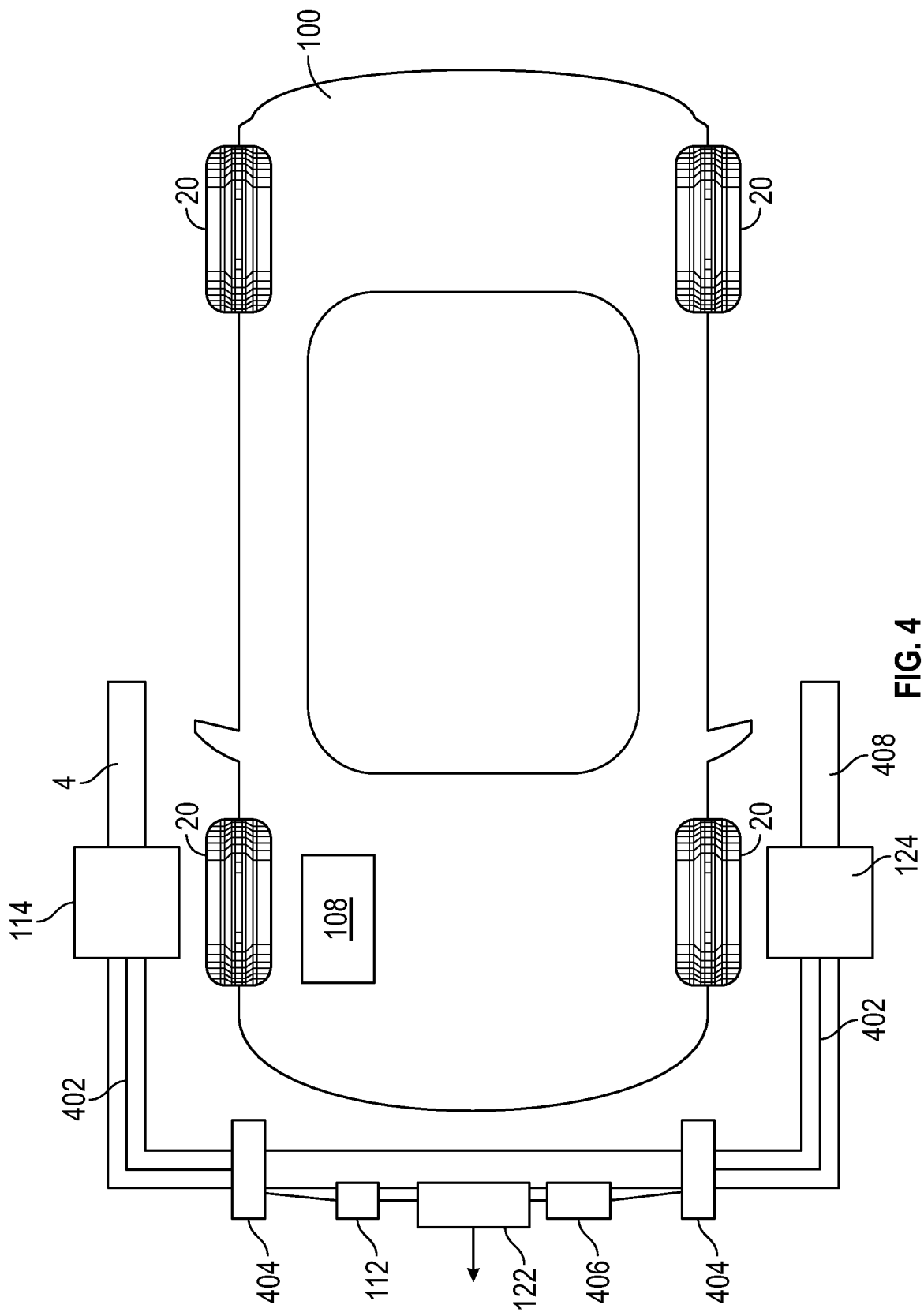
FIG. 4 is a schematic diagram illustrating safety sensor guidance system for temporary use on a partially assembled vehicle that is configured to complete its own assembly, in accordance with various embodiments.

With reference to FIG. 4, some embodiments of the safety sensor guidance system 110 include transceiver 112 functionality and a communication fabric 402 (wired or wireless) specifically configured to manage communication between the central platform controller 108 and various external sources 150 (via 151).

In embodiments with a communication fabric 402, it may be configured to receive the begin data package from the external source 150 and, responsive thereto, begin the temporary takeover of a central platform controller 108. Additionally, in embodiments with a communication fabric 402, it may be configured to receive data and instructions at each assembly station and communicate status back to the various external sources 150.

Some embodiments of the safety sensor guidance system 110 further include an auxiliary navigation sensor 406 configured narrowly, for navigational maneuvers throughout a manufacturing floor. In some embodiments, the elements of the safety sensor guidance system 110 are each affixed to a rigid support structure 408 that can be easily attached to the chassis. While the partially assembled vehicle 100 of FIG. 4 shows a safety sensor guidance system 110 that is only on a front part of the vehicle, in other embodiments, the components shown in the structure 4 can be mirrored and placed on the rear of the vehicle 100.

In some embodiments, the safety sensor guidance system 110 further includes one or more visual alerting devices 404. A non-limiting example of the visual alerting device 404 includes a LED system configured to emit different colors of light to communicate status; such as, green for "no issues", yellow for a caution, and red for a warning including temporal flashing patterns, to prompt operator attention. In some embodiments, more than one visual alerting device 404 is included in the safety sensor guidance system 110, and each of the more than one visual alerting device 404 is assigned to a different system or operation status, for example, one for a battery charge level, one for showing a mode of operation, etc.

Returning focus to the partially assembled vehicle 100, operations performed by the partially assembled vehicle 100 may be centrally managed. In FIG. 1, the central management of tasks/operations is provided by the controller circuit 104. In other embodiments, the central management of tasks/operations may be generated by a controller module, PLA, custom circuit, or the like. In various embodiments, the controller circuit 104 is communicatively coupled to onboard systems and components, and in particular, the central platform controller 108, via the communication bus 130. The controller circuit 104 and/or the central platform controller 108 are each configured to transmit commands, controls, and power for various onboard systems and components via the communication bus 130. The controller circuit 104 is programmed to, during operation (assembly) of the partially assembled vehicle 100, override the power management and management performed by the central platform controller 108.

In various embodiments, as shown in FIG. 1, the controller circuit 104 is realized as an enhanced computer system, comprising computer readable storage device or media, memory 54, for storage of instructions, algorithms, and/or programs 56, and operating parameters 58, such as, preprogrammed model and configuration requirements. The controller circuit 104 also includes a processor 50 to execute the program 56, and an input/output interface (I/O) 52. The computer readable storage device or media, memory 54, may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The memory 54 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle 100. In various embodiments, processor 50 is configured to implement the system 102. The memory 54 may also be utilized by the processor 50 to cache data, to temporarily store results of comparisons and analyses, and the like. Information in the memory 54 may be organized and/or imported from an external source during an initialization or installment operation in a method; it may also be programmed via a user I/O interface.

The input/output interface (I/O) 52 may be operationally coupled to the processor 50 via a bus and enables intra-circuit 104 communication as well as extra-circuit 104 communication. The input/output interface (I/O) 52 may include one or more wired and/or wireless network interfaces and can be implemented using any suitable method and apparatus. In various embodiments, the input/output interface (I/O) 52 includes the hardware and software to support one or more communication protocols for wireless communication between the processor 50 and external sources, such as satellites, the cloud, communication towers and ground stations. In various embodiments, the input/output interface (I/O) 52 supports communication with technicians, and/or one or more storage interfaces for direct connection to storage apparatuses.

During operation of the partially assembled vehicle 100, the processor 50 loads and executes one or more algorithms, instructions, and rules embodied as program 56, and, as such, controls the general operation of the system 102. During operation of the system 102, the processor 50 may receive data from the communication bus 130 or external sources 150. In various embodiments of the system 102, the Controller Circuit 104 may: perform operations attributed to the system 102 in accordance with an algorithm; perform operations in accordance with state machine logic; and perform operations in accordance with logic in a programmable logic array.

While the exemplary embodiment of the partially assembled vehicle 100 is described in the context of the Controller Circuit 104 implemented as a fully functioning enhanced computer system, those skilled in the art will recognize that the mechanisms of the present disclosure are capable of being distributed as a program product including program 56 and predefined parameters. Such a program product may comprise an arrangement of instructions organized as multiple interdependent program code modules, each configured to achieve a separate process and/or perform a separate algorithmic operation, arranged to manage data flow through the system 102. The program code modules may each comprise an ordered listing of executable instructions for implementing logical functions for the processes performed by the system 102. The instructions in the program code modules, when executed by a processor (e.g., processor 50), cause the processor to receive and process signals, and perform logic, calculations, methods and/or algorithms as described herein for automatically and in real-time performing vehicle-target localization and generating associated commands.

Once developed, the program code modules constituting a program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Figure 2:
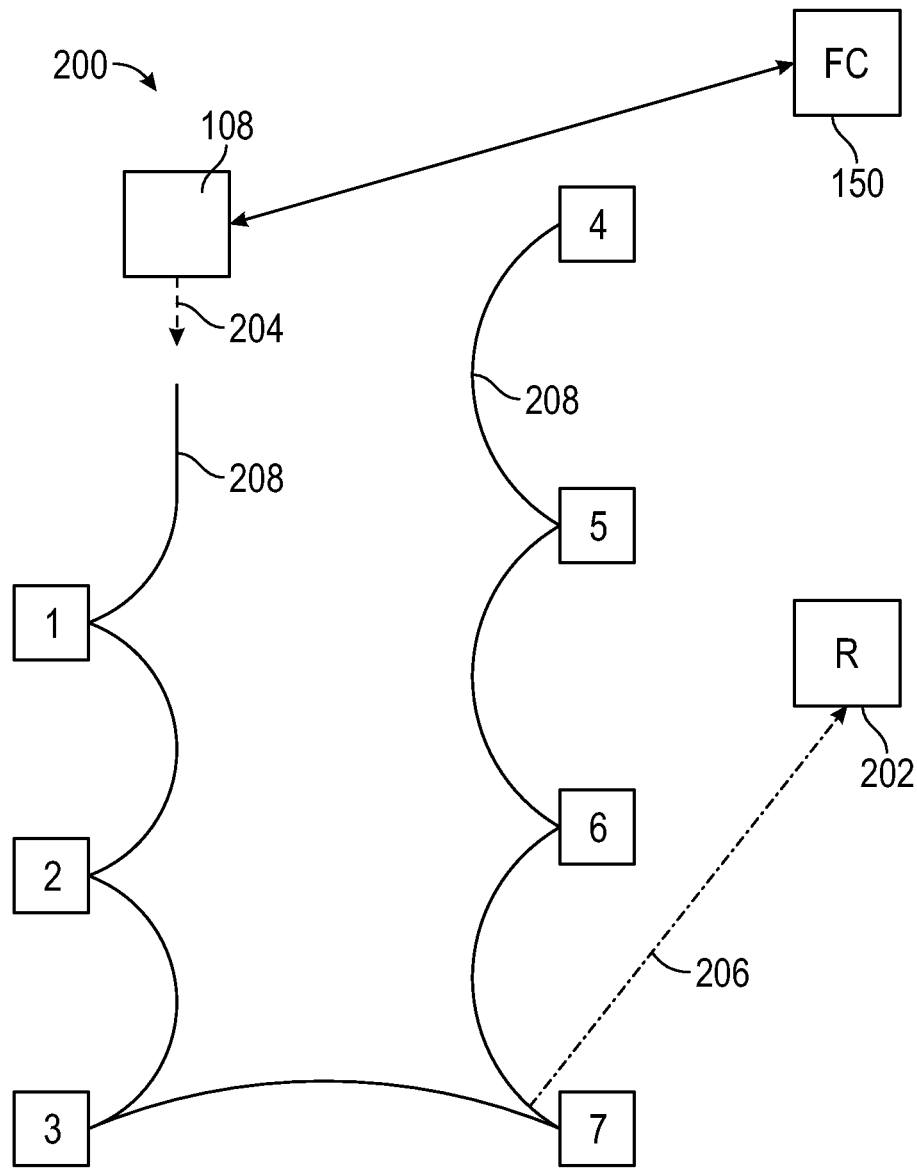
FIG. 2 is a simplified top-down illustration showing the partially assembled vehicle and a plurality of assembly stations that the partially assembled vehicle visits to complete its own assembly, in accordance with various embodiments.

FIG. 2 is a simplified top-down illustration 200 showing the partially assembled vehicle 100 and a plurality of assembly stations that the partially assembled vehicle 100 visits to complete its own assembly. In the example, the plurality is indicated with seven assembly stations (1-7). The sequence is a sequence of assembly stations, putting them in a temporal order. The sequence is indicated the line 208 connecting the assembly stations, and the indicated sequence is: 1, 2, 3, 7, 6, 5, 4.

The construction of the sequence in which to visit each of the plurality of assembly stations may be influenced by one or more factors, such as: a shortest distance between assembly stations, an availability of parts/vehicle components at an assembly station, a queue of other partially assembled vehicles at a given assembly station, an inter-component dependency, and the like. In an embodiment, the sequence is one of multiple potential sequences in which to visit each of the plurality of assembly stations, and wherein the controller circuit 104 is further programmed to: receive, from each of the plurality of assembly stations, a respective status indicator; and construct the sequence as a function of the received status indicators.

Once the sequence is constructed, the controller circuit 104 commands the drive systems 106 to propel and steer (e.g., via path 208) the partially assembled vehicle 100 through the sequence of the plurality of assembly stations. The commands to propel and steer may be further conditioned by, or responsive to, safety situations detected by sensors in the safety sensor guidance system 110. For example, when the sensor data from the safety sensor guidance system 110 indicates that an object or person is in the way of the vehicle, the controller circuit 104 will, responsive thereto, command the drive systems 106 to temporarily cease propelling and steering until the safety situation is resolved or be used in combination with the navigation system to safely proceed on a path that allows the vehicle to proceed while maintaining a safe distance.

At each assembly station, an assembly associated with the assembly station is performed. For example, an installation of a camera system, or an installation of a user interface device, uploading high-definition map data, etc. This assembly may be triggered by arrival of the partially assembled vehicle 100 at the assembly station. The assembly may be performed by an external device, external system (such as a robot), or a person. Upon detection of completion of the assembly, the controller circuit 104 runs a respective in-station diagnostic (test) to determine whether the assembly was a pass (a success) or a failure. In some embodiments, the step of running the in-station diagnostic may include first receiving instructions from the external fleet control. In other embodiments, the step of running the in-station diagnostic may include receiving the in-station diagnostic test via a temporary communication with a source at the respective assembly station. In still other embodiments, the step of running the in-station diagnostic test may be completely managed by the program 56 loaded in the controller circuit 104.

As may be appreciated, the step of commanding the drive system is informed by the pass/fail status at each assembly station. For example, upon a pass at a current assembly station, the step of commanding the drive system automatically proceeds to propel and steer the partially assembled vehicle 100 to the next assembly station in the sequence. However, responsive to a fail at an assembly station, the controller circuit 104 may modify or interrupt the sequence, such as, to proceed to a repair station 202. This scenario is illustrated with the dashed-dotted line 206, from assembly station 7. In various embodiments, the controller circuit 104 may also modify or interrupt the commanding of the drive system of the partially assembled vehicle 100 through the sequence, responsive to receiving a repair data package from the external fleet control source 150. For example, the external fleet control source 150 may override the constructed sequence to impose a different sequence, and responsive thereto, the controller circuit 104 may modify or interrupt the commanding of the drive system of the partially assembled vehicle 100 to proceed through the different sequence. In another example, the external fleet control source 150 may override the constructed sequence to take the partially assembled vehicle 100 to a designated repair station. Examples of this scenario may include swapping out old revisions of a vehicle component.

As may also be appreciated, in practice, there will likely be many more assembly stations and multiple repair stations.

Figure 3:
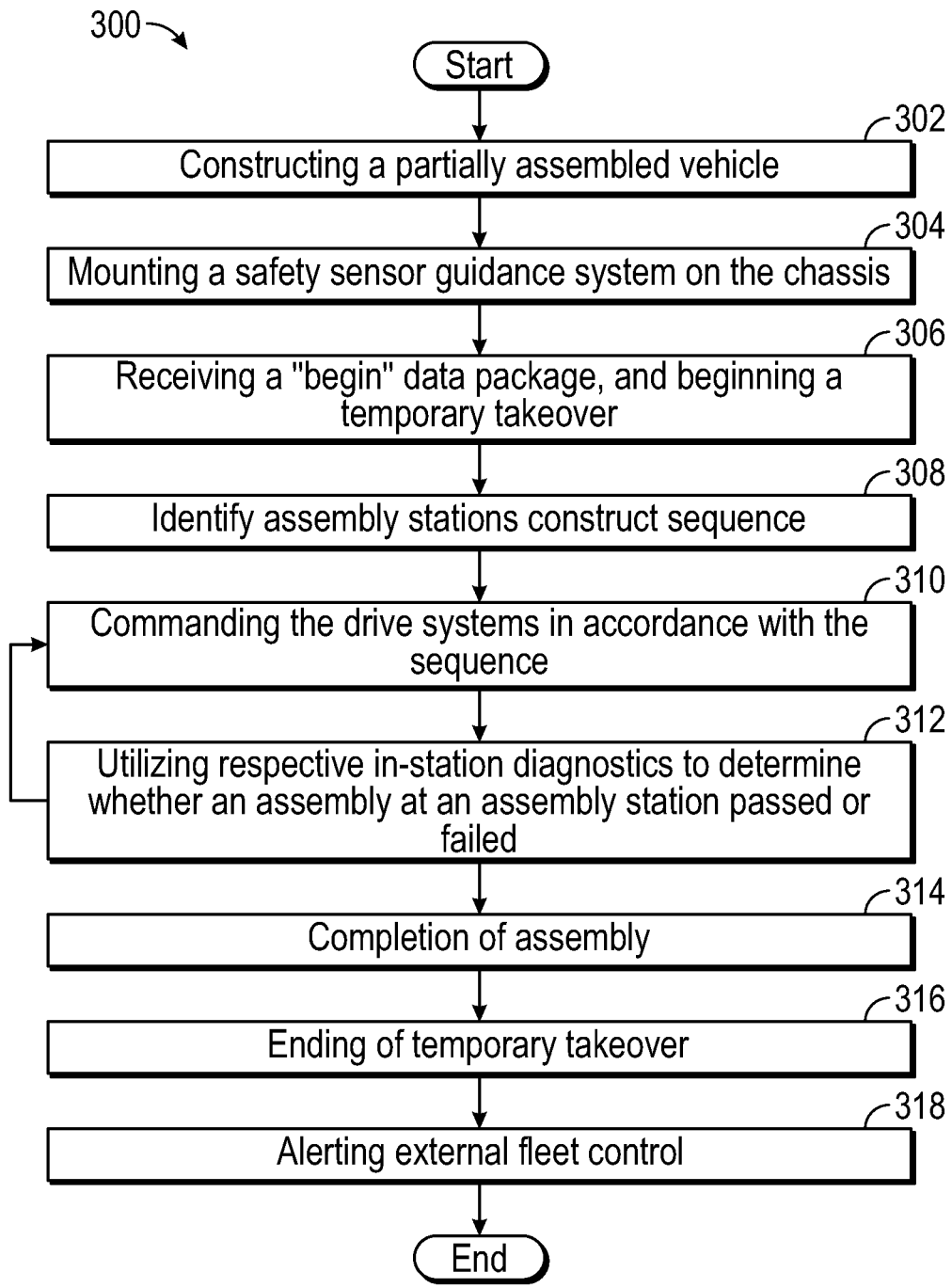
FIG. 3 is a process flow chart depicting an example method for a partially assembled vehicle to autonomously complete its own assembly, in accordance with various embodiments.

Turning now to FIG. 3, and with continued reference to FIGS. 1-2, various method steps for a partially assembled vehicle to autonomously complete its own assembly are described, shown generally as method 300.

In an application, the functionality attributed to the controller circuit 104 may be realized as one or more sub-modules, and the modules and sub-modules may be distributed among and between various onboard systems and components. In various examples, the program 56 and stored variables and pre-loaded custom operating parameters 58 embody the application process modules of the controller circuit 104.

For illustrative purposes, the following description of method 300 may refer to elements mentioned above in connection with FIGS. 1-2. In various embodiments, portions of method 300 may be performed by different components of the described partially assembled vehicle 100. It should be appreciated that method 300 may include any number of additional or alternative operations and tasks, the tasks shown in FIG. 3 need not be performed in the illustrated order, and method 300 may be incorporated into a more comprehensive procedure or method, such as an energy saving or safety application, having additional functionality not described in detail herein. Moreover, one or more of the tasks shown in FIG. 3 could be omitted from an embodiment of the method 300 if the intended overall functionality remains intact.

At 302, the method begins with constructing the partially assembled vehicle, as described above. The partially assembled vehicle comprises a chassis and wheels that are rotationally coupled to the chassis, a drive system mounted on the chassis and in operational communication with the wheels, and, on-board the partially assembled vehicle, and in operable communication with each other: a drive system, a navigation system, a central platform controller, and a position determining system.

At 304, a safety sensor guidance system is mounted to the chassis, the safety sensor guidance system comprising a sensor, a transceiver, and an emergency stop (estop) device; and At 306, the automation begins. This includes, responsive to receiving a begin data package from an external fleet control source; beginning a temporary takeover of the central platform controller 108. The beginning of the temporary takeover can represent a "manufacturing mode" and may include installing or executing a temporary program in the central platform controller 108. The temporary takeover may include imposing, via the central platform controller 108, a temporary power management regime for onboard systems and components and activating the transceiver 112 to continuously communicate with the external fleet control source. The temporary takeover may include decoding the begin data package to therewith (at 308) identify a plurality of assembly stations that the partially assembled vehicle visits to complete its own assembly. At 308, the method also constructs a sequence in which to visit each of the plurality of assembly stations.

At 310, the method includes commanding the drive system to propel and steer the partially assembled vehicle through the sequence of the plurality of assembly stations. At 310, the commanding may also be responsive to sensor input from the safety sensor guidance system 110. In some embodiments, the navigation of the partially assembled vehicle through the sequence is monitored by the navigation system 120. In other embodiments, the navigation of the partially assembled vehicle through the sequence is monitored by the auxiliary navigation sensor 406.

At 312, the method proceeds to utilizing in-station diagnostics to determine, when the partially assembled vehicle is at each assembly station in the sequence, whether an assembly associated with the assembly station passed or failed. As used herein, the pass at the assembly station is also considered a successful or completed assembly.

Each time an assembly station is completed, the partially assembled vehicle 100 proceeds, via commanding of the drive system, to a next assembly step in the sequence. Accordingly, the step 310 is influenced by the outcome determined at 312. Any sensors 114 are understood to be sensing the surrounding area continuously as the vehicle proceeds.

Completion of assembly at 314 is determined when the controller circuit 104 and/or communication fabric 402 determines that the partially assembled vehicle has autonomously completed its own assembly. Responsive to 314, the method may end the temporary takeover at 316. At 316, the controller circuit 104 may be further programmed to remove the temporary program installed at the beginning of the temporary takeover (at 306), which effectively ends manufacturing mode and puts the vehicle into a customer mode, subsequent to alerting the external fleet control source that the partially assembled vehicle has autonomously completed its own assembly. At 318, the controller circuit 104 may alert the external fleet control of the completion of the assembly at 318. As one may appreciate, after completion of the assembly of the partially assembled vehicle 100, components of the safety sensor guidance system 110 may be removed.

Optional functionality supported by the method 300 include modifying or interrupting the commanding of the drive system of the partially assembled vehicle through the sequence, responsive to receiving a repair data package from the external fleet control source, as described above. Additionally, in various embodiments, the estop device 118 can be pulled/activated by a person in proximity of the partially assembled vehicle 100, and response to responsive to detecting an activation of the estop device, the controller circuit 104 may prevent operation of the drive system (in particular, movement of the wheels 20), until the cause for the activated estop device has been addressed. Further, the provided partially assembled vehicle 100 can identify its charging needs and travel to a charge station on its own or responsive to commands from fleet control.

Thus, the provided partially assembled vehicle 100 and method for a partially assembled vehicle to autonomously complete its own assembly has been described. The provided partially assembled vehicle 100 is autonomous (self-guided and self-powered), which permits the vehicle tires (wheels 20) to be placed onto the assembly plant floor, rather than on a conveyer belt.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A partially assembled vehicle system that autonomously transports itself through its own assembly process, the partially assembled vehicle system comprising:
   a chassis and wheels that are rotationally coupled to the chassis, a drive system mounted on the chassis and in operational communication with the wheels, and further comprising, on-board the chassis, and in operable communication with each other: a navigation system, a central platform controller, and a position determining system;
   a safety sensor guidance system is vehicle mounted to the chassis, the safety sensor guidance system comprising a sensor, a transceiver, and an emergency stop (estop) device;
   at least one external fleet controller that is external to the partially assembled vehicle and that is configured to communicate with a fleet of the partially assembled vehicles; and
   a controller circuit operationally coupled to the central platform controller and the safety sensor guidance system, the controller circuit programmed to:
   begin a temporary takeover of the central platform controller, responsive to receiving a begin data package that identifies a model and configuration information for the partially assembled vehicle, the temporary takeover including the steps of:
     activating the transceiver to communicate with the external fleet control source;
     identifying a plurality of assembly stations that the partially assembled vehicle must visit to complete its own assembly;
     constructing a sequence in which to visit each of the plurality of assembly stations as a function of the model and configuration information;
     commanding the drive system to propel, brake and steer the partially assembled vehicle through the sequence of the plurality of assembly stations, responsive to sensor data from the safety sensor guidance system;
     determining, when the partially assembled vehicle is at each assembly station in the sequence, that an assembly associated with the assembly station was completed upon passing a respective in-station diagnostic test;
     wherein, commanding the drive system is further a function of determining, for a current assembly station, that the assembly associated with the current assembly station was completed;
     modifying the sequence, responsive to receiving a repair data package from the at least one external fleet controller;
     preventing operation of the drive system responsive to detecting an activation of the estop device;
     determining that the partially assembled vehicle has autonomously completed its own assembly upon determining that the partially assembled vehicle has completed the sequence;
     ending the temporary takeover upon determining that the partially assembled vehicle has autonomously completed its own assembly; and
   alert the external fleet control source upon determining that the partially assembled vehicle has autonomously completed its own assembly;
   wherein the in-station diagnostic test is initiated based on instructions from the external fleet controller that controls the partially assembled vehicle system along with additional partially assembled vehicle systems belong to the same fleet, and wherein the partially assembled vehicle system is instructed by the external fleet controller to proceed to a designated repair station instead of the next assembly station in sequence when it is determined that the partially assembled vehicle system has failed the in-station diagnostic test, and wherein the repair station is configured to swap out non-current versions of one or more vehicle components for the partially assembled vehicle system.

2. The partially assembled vehicle system of claim 1, wherein the controller circuit is further programmed to perform the steps of:
   determining, when the partially assembled vehicle is at an assembly station of the plurality of assembly stations that the partially assembled vehicle visits to complete its own assembly, that the assembly associated with the assembly station is incomplete upon failing the respective in-station diagnostic test;
   alerting the at least one external fleet controller to an incomplete assembly; and
   wherein commanding the drive system is further a function of routing instructions responsive to the incomplete assembly.

3. The partially assembled vehicle system of claim 1, wherein beginning the temporary takeover of the central platform controller comprises installing a temporary program into the central platform controller, and wherein the controller circuit is further programmed to remove the temporary program subsequent to alerting the external fleet control source that the partially assembled vehicle has autonomously completed its own assembly; and wherein the temporary program includes instructions that override power distribution in the partially assembled vehicle, and instructions that control functionality of propulsion, braking and steering.

4. The partially assembled vehicle system of claim 1, wherein the sequence is one of multiple potential sequences in which to visit each of the plurality of assembly stations, and wherein the controller circuit is further programmed to: receive, from each of the plurality of assembly stations, a status indicator; and construct the sequence as a function of the received status indicators.

5. The partially assembled vehicle system of claim 1, wherein the safety sensor guidance system further comprises a path projector configured to project a visible beam forward from a center of the partially assembled vehicle.

6. The partially assembled vehicle system of claim 1, wherein the sensor in the safety sensor guidance system is a first sensor affixed to a first corner of the chassis, and wherein the safety sensor guidance system further includes a second sensor affixed to a second corner of the chassis.

7. The partially assembled vehicle system of claim 6, wherein the first sensor and the second sensor are each configured to detect intrusion into a predetermined range from the respective sensor.

8. The partially assembled vehicle system of claim 7, wherein the predetermined range is less than two feet but in practice would be dictated by accepted standards for safety rated sensing and stopping distance.

9. The partially assembled vehicle system of claim 6, wherein the safety sensor guidance system further includes, in addition to the first sensor affixed to a first corner of the chassis and a second sensor affixed to the second corner of the chassis, a third sensor affixed to a third corner of the chassis, and a fourth sensor affixed to a fourth corner of the chassis, and wherein each of the first sensor, the second sensor, the third sensor, and the fourth sensor are configured to sense in a three-dimensional volume, such that the volumes overlap to create a buffer zone around the chassis.

10. The partially assembled vehicle system of claim 9, wherein the safety sensor guidance system further includes:
a wireless communication fabric specifically configured to manage communication between the central platform controller and various external sources, including the external fleet controller;
an auxiliary navigation sensor configured narrowly, for navigational maneuvers throughout a manufacturing floor; and
one or more visual alerting devices configured to emit different colors of light to communicate status; including, green for "no issues", yellow for a caution, and red for a warning including temporal flashing patterns, to prompt operator attention.

11. The partially assembled vehicle system of claim 1, wherein the running of the in-station diagnostic further includes receiving the in-station diagnostic test via a temporary communication with a source at the respective assembly station.

12. The partially assembled vehicle assembly of claim 1, wherein the controller circuit is further configured to modify or interrupt a sequence, such as, to proceed to a repair station, and to modify or interrupt the commanding of the drive system of the partially assembled vehicle through the sequence, responsive to receiving a repair data package from the external fleet controller.

13. The partially assembled vehicle assembly of claim 1, wherein the external fleet controller is configured to override a constructed sequence to impose a different sequence, and responsive thereto, the controller circuit is configured to modify or interrupt the commanding of the drive system of the partially assembled vehicle to proceed through the different sequence.

14. A method for a partially assembled vehicle to autonomously transporting itself through a process to complete its own assembly, the method comprising:
constructing the partially assembled vehicle comprising a chassis and wheels that are rotationally coupled to the chassis, a drive system mounted on the chassis and in operational communication with the wheels, and, on-board the partially assembled vehicle, and in operable communication with each other: a navigation system, a central platform controller, and a position determining system;
mounting a safety sensor guidance system to the chassis, the safety sensor guidance system comprising a sensor, a transceiver, and an emergency stop (estop) device;
providing at least one external fleet controller that is external to the partially assembled vehicle and that is configured to communicate with a fleet of the partially assembled vehicles;
and
a controller circuit operationally coupled to the central platform controller and the safety sensor guidance system, performing the steps of:
receiving a begin data package from an the external fleet control source, wherein the begin data package identifies a model and configuration information for the partially assembled vehicle;
beginning a temporary takeover of the central platform controller, responsive to receiving the begin data package, the temporary takeover including the steps of:
activating the transceiver to communicate with the external fleet control source;
identifying a plurality of assembly stations that the partially assembled vehicle must visit to complete its own assembly;
constructing a sequence in which to visit each of the plurality of assembly stations as a function of the model and configuration information;
commanding the drive system to propel and steer the partially assembled vehicle through the sequence of the plurality of assembly stations, responsive to sensor data from the safety sensor guidance system;
determining, when the partially assembled vehicle is at each assembly station in the sequence, that an assembly associated with the assembly station was completed upon passing a respective in-station diagnostic test;
wherein, commanding the drive system is further a function of determining, for a current assembly station, that the assembly associated with the current assembly station was completed;
modifying the sequence, responsive to receiving a repair data package from the at least one external fleet controller;
preventing operation of the drive system responsive to detecting an activation of the estop device; and ending the temporary takeover upon determining that the partially assembled vehicle has autonomously completed its own assembly; and alert the external fleet control source upon determining that the partially assembled vehicle has autonomously completed its own assembly;

wherein the in-station diagnostic test is initiated based on instructions from the external fleet controller that controls the partially assembled vehicle system along with additional partially assembled vehicle systems belong to the same fleet, and wherein the partially assembled vehicle system is instructed by the external fleet controller to proceed to a designated repair station instead of the next assembly station in sequence when it is determined that the partially assembled vehicle system has failed the in-station diagnostic test, and wherein the repair station is configured to swap out non-current versions of one or more vehicle components for the partially assembled vehicle system.

15. The method of claim 14, wherein beginning the temporary takeover of the central platform controller comprises installing a temporary program into the central platform controller, and further comprising removing the temporary program subsequent to alerting the at least one external fleet controller that the partially assembled vehicle has autonomously completed its own assembly.

16. The method of claim 15, wherein the temporary program includes instructions that override power distribution in the partially assembled vehicle, and instructions that control functionality of propulsion and steering.

17. The method of claim 14, wherein the sequence is one of multiple potential sequences in which to visit each of the plurality of assembly stations, and further comprising:

receiving, from each of the plurality of assembly stations, a status indicator; and constructing the sequence as a function of the received status indicators.

18. A safety sensor guidance system for temporary use on a partially assembled vehicle that autonomously transports itself through a process and completes its own assembly, the safety sensor guidance system comprising:

an auxiliary navigation sensor;

a sensor configured to detect intrusion into a predetermined range;

an estop device; and a communication fabric in operational communication with the auxiliary navigation sensor, the sensor, and the estop device, the communication fabric configured to receive a begin data package from an external source and, responsive thereto, begin a temporary takeover of a central platform controller, wherein the external source is external to the partially assembled vehicle and is configured to communicate with a fleet of partially assembled vehicles, wherein the temporary takeover includes the steps of:

commanding the drive system to propel and steer the partially assembled vehicle through a sequence of a plurality of assembly stations, wherein the sequence is determined as a function of a model and configuration information received as a part of the begin data package;

receiving, from the central platform controller, a determination, when the partially assembled vehicle is at each assembly station in the sequence, that an assembly associated with the assembly station was completed upon passing a respective in-station diagnostic test;

further commanding the drive system as a function of the determination, for a current assembly station, that the assembly associated with the current assembly station was completed;

modifying the sequence to include a repair station, responsive to receiving a repair data package from the external source;

preventing operation of the drive system responsive to detecting an activation of the estop device;

determining that the partially assembled vehicle has autonomously completed its own assembly upon determining that the partially assembled vehicle has completed the sequence; and ending the temporary takeover upon determining that the partially assembled vehicle has autonomously completed its own assembly;

wherein the in-station diagnostic test is initiated based on instructions from the external fleet controller that controls the partially assembled vehicle system along with additional partially assembled vehicle systems belong to the same fleet, and wherein the partially assembled vehicle system is instructed by the external fleet controller to proceed to the repair station instead of the next assembly station in sequence when it is determined that the partially assembled vehicle system has failed the in-station diagnostic test, and wherein the repair station is configured to swap out non-current versions of one or more vehicle components for the partially assembled vehicle system.

19. The safety sensor guidance system of claim 18, further comprising, one or more visual alerting devices in operable communication with the communication fabric and configured to visually represent a respective status of a system of the partially assembled vehicle.

20. The safety sensor guidance system of claim 18, further comprising a support structure that is configured to surround at least a portion of the partially assembled vehicle and to be attached thereto, to which remaining components of the safety sensor guidance system are attached.

* * * * *